United States Patent
Yangsong

(10) Patent No.: US 10,776,421 B2
(45) Date of Patent: Sep. 15, 2020

(54) MUSIC SEARCH SYSTEM, MUSIC SEARCH METHOD, SERVER DEVICE, AND PROGRAM

(71) Applicant: Demucoyan, Inc., Tokyo (JP)

(72) Inventor: Kwon Yangsong, Tokyo (JP)

(73) Assignee: DEMUCOYAN, INC., Tokyo (JP)

(*) Notice: Subject to any disclaimer, the term of this patent is extended or adjusted under 35 U.S.C. 154(b) by 178 days.

(21) Appl. No.: 15/754,082

(22) PCT Filed: Aug. 21, 2015

(86) PCT No.: PCT/JP2015/073474
§ 371 (c)(1),
(2) Date: Feb. 21, 2018

(87) PCT Pub. No.: WO2017/033220
PCT Pub. Date: Mar. 2, 2017

(65) Prior Publication Data
US 2018/0239819 A1    Aug. 23, 2018

(51) Int. Cl.
G06F 16/00    (2019.01)
G06F 16/68    (2019.01)
G06F 16/632   (2019.01)
G06F 16/638   (2019.01)
G06F 16/683   (2019.01)
G06F 3/0482   (2013.01)

(52) U.S. Cl.
CPC ............ *G06F 16/68* (2019.01); *G06F 3/0482* (2013.01); *G06F 16/00* (2019.01); *G06F 16/632* (2019.01); *G06F 16/638* (2019.01); *G06F 16/683* (2019.01)

(58) Field of Classification Search
None
See application file for complete search history.

(56) References Cited

U.S. PATENT DOCUMENTS

| 2004/0003706 A1 | 1/2004 | Tagawa et al. |
| 2006/0080342 A1* | 4/2006 | Takaki ............... G06F 16/444 |

(Continued)

FOREIGN PATENT DOCUMENTS

| JP | 2002032376 | 1/2002 |
| JP | 2003067397 | 3/2003 |

(Continued)

*Primary Examiner* — Son T Hoang
(74) *Attorney, Agent, or Firm* — Workman Nydegger

(57) ABSTRACT

A music search system, a music search method, a server apparatus, and a program that manage music data in association with information of 5W1H and make it possible to search for songs matched with user preferences and situations based on a 5W1H search keyword. The server device 1 includes a music DB 13 in which music data, 5W1H information, and the number of playing are stored in association with each other, a searching unit 11 *e* for searching for music on the basis of a search request from the device, a screen generation unit 11 *c* for generating image data for displaying the search results in a list format, and a 5W1H update unit 11 *d* for updating the 5W1H information. When the information terminal registers music in the library, the 5W1H information used at the time of searching the music is transmitted to the server device. Then, the 5W1H update unit 11 *d* updates the 5W1H information of the music DB 13 based on the transmitted 5W1H information.

5 Claims, 13 Drawing Sheets

| user ID | date of bir | sex | name | display name | image | password | library | provider ID |
|---|---|---|---|---|---|---|---|---|
| U0001 | | | | | | | G0001, G0002 ... | |
| U0002 | | | | | | | | |
| U0003 | | | | | | | | P0021 |
| ... | | | | | | | | |

(56) References Cited

U.S. PATENT DOCUMENTS

| | | | |
|---|---|---|---|
| 2011/0040707 A1* | 2/2011 | Theisen | G11B 27/105 |
| | | | 706/12 |
| 2013/0263006 A1* | 10/2013 | McCoy | H04N 21/458 |
| | | | 715/738 |
| 2015/0142779 A1* | 5/2015 | Gupta | G06F 17/2705 |
| | | | 707/722 |
| 2016/0371373 A1* | 12/2016 | Dean | G06F 16/639 |

FOREIGN PATENT DOCUMENTS

| | | |
|---|---|---|
| JP | 2004086189 | 3/2004 |
| JP | 2008234419 | 10/2008 |

* cited by examiner

FIG. 3

| music ID | provider ID | title | 5 W1H | songwriter | composer | lyrics | number of play | number of library registrations | weather info | GPS info |
|---|---|---|---|---|---|---|---|---|---|---|
| G0001 | | | | | | | | | | |
| G0002 | | | | | | | | | | |
| G0003 | | | | | | | | | | |
| ... | | | | | | | | | | |

FIG. 4

| provider ID | date of birth | sex | payee information | name | display name | image | live concert ID | music ID |
|---|---|---|---|---|---|---|---|---|
| P0001 | | | | | | | | G2741 |
| P0002 | | | | | | | | G0302 |
| P0003 | | | | | | | | G5910 |
| ⋮ | | | | | | | | |

FIG. 5

| user ID | date of bir | sex | name | display name | image | password | library | provider ID |
|---|---|---|---|---|---|---|---|---|
| U0001 | | | | | | | G0001、G0002 ... | |
| U0002 | | | | | | | | |
| U0003 | | | | | | | | P0021 |
| ⋮ | | | | | | | | |

FIG. 6

| live concert ID | provider ID | music ID | date and time | place | ticket fee | the number of people | other information |
|---|---|---|---|---|---|---|---|
| L0001 | P0023 | G0087 | | | | | |
| L0002 | P0006 | G0012 | | | | | |
| L0003 | P1089 | G6802 | | | | | |
| ⋮ | | | | | | | |

MUSIC SEARCH SYSTEM, MUSIC SEARCH METHOD, SERVER DEVICE, AND PROGRAM

TECHNICAL FIELD

This invention relates to a music search system, a music search method, a server apparatus, and a program that can search music matching a user's preference, circumstances, etc, by using 5W1H(When/Where/Who(m)/What/Why/How) information as a search keyword.

BACKGROUND ART

Conventionally, a wide variety of music data can be downloaded via the Internet regardless of genre. Therefore, the user can listen to the music by selecting the desired music via applications. And today, because a huge number of songs can be found through the internet, it is very important how efficiently it is possible to search for songs which match his/her preference and circumstances.

Here, for example, Patent Document 1 discloses a karaoke apparatus. This apparatus comprises a database in which priorities are described for each music data, an input means for accepting a search condition of music data, music data retrieval means for outputting sorting in order according to the priority of a database which is searched based on the received search condition, and the search results.

PRIOR ART DOCUMENT

Patent Document

Japanese Unexamined Patent Application Publication No. 2010-33525

SUMMARY OF THE INVENTION

Issues to be Solved by the Invention

However, in Patent Document 1, the priority is merely information that sets the numerical value of the new song high, and the retrieval of the song that matched the user's taste and situation was not performed.

In determining such user's preferences and circumstances, it has not been conventionally used to use 5W1H information as a search keyword. Here, the 5W1H information is generally information that means when, where, who(m), what, why, how.

The present invention has been made to solve such problems, and there is an object of the present invention to manage music data and 5W1H information in association with each other and to search for songs matched with user's preferences and circumstances by using 5W1H information as a search keyword.

Solution to Solve the Issue

In order to solve the above problem, the music search system of the present invention is composed of a user's device 2 and a server device. The device includes a search requesting unit for receiving 5W1H information and making a search request for a music, a music reproducing unit for reproducing a music, and a library registering unit for registering the music in a library. The server device includes: a music storage unit in which music data, 5W1H information, and the play count are stored in association with each other; a search unit that executes music search based on a search request from the device; a search result in the form of a list, and an updating unit for updating the 5W1H information. The library registration unit of the device transmits the 5W1H information used at the time of searching the music at the time of registering the music in the library to the server device, and the updating unit of the server device transmits the 5W1H and updates the 5W1H information of the music storage unit based on the information.

A music search method according to a second aspect of the present invention is a music search system including a user's device 2 and a server device. The user's device 2 has a step of making a search request for music on the basis of 5W1H information and a step of registering music in the library. In addition, the server device has a step of executing a search of a music on the basis of a search request from the user's device 2, a step of generating image data for displaying the search result in a list format, a step of updating the 5W1H information. The user's device 2 transmits the 5W1H information used at the time of searching the music to the server device at the time of registering the music in the library, and the server device updates 5W1H information in the music storage unit based on the transmitted 5W1H information from user's device 2.

Furthermore, the server device according to the third aspect of the present invention is that can communicate with the user's device 2. The server device includes: a music storage unit in which music data, 5W1H information, and the play count are stored in association with each other; a search unit that executes music search based on a search request from the information terminal; a screen generating unit for generating image data for displaying in a list form, and an updating unit for updating the 5W1H information. The server device receives the 5W1H information used at the time of searching the music when the user's device 2 registers the music in the library, and the updating unit updates the 5W1H information of the music storage unit based on the transmitted 5W1H information.

A program according to a fourth aspect of the present invention is executed by a server apparatus having a music storage unit which is freely communicable with the user's device 2 and in which music data, 5W1H information, and the play count are stored in association with each other. A program according to the present invention is characterized in that the server device comprises a search unit for executing a music search on the basis of a search request from the user's device 2, a screen generation unit for generating image data for displaying the search result in a list form, and an updating unit that updates the 5W1H information of the storage unit. The program of the present invention is characterized in that it receives the 5W1H information used at the time of retrieval of the song when the user's device 2 registers the song in the library, and the updating unit updates the 5W1H information of the music storage unit based on the transmitted 5W1H information.

Effect of the Invention

The present invention can provide a music search system, a music search method, a server device, and a program that make it possible to search for music that matches the user's preferences and circumstances using the 5W1H information as a search keyword.

BRIEF DESCRIPTION OF FIGURES

FIG. 3 is a diagram showing a configuration example of a music management table.

FIG. 4 is a diagram showing a configuration example of a provider management table.

FIG. 5 is a diagram showing a configuration example of a user management table.

FIG. 6 is a diagram showing a configuration example of a live concert information management table.

DETAILED DESCRIPTION OF THE INVENTION

Hereinafter, embodiments of the present invention will be described with reference to the figures.

First Embodiment

First, a first embodiment of the present invention will be described.

Figure 1:
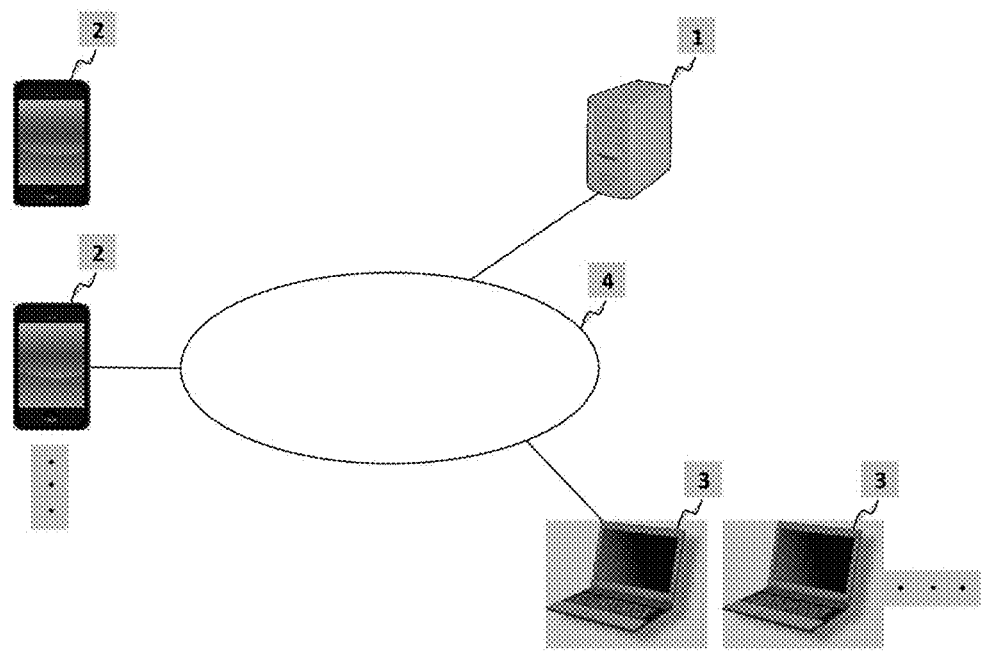
FIG. 1 is a configuration diagram of a music search system according to a first embodiment of the present invention.

FIG. 1 shows a configuration of a music search system according to a first embodiment of the present invention.

As shown in FIG. 1, the music search system is configured by a combination of the server apparatus 1 and the device 2, the server apparatus 1 and the device 3, or any combination of the server apparatus 1 and the devices 2 and 3. The server 1 registers and searches for music and is connected to the devices 2, 3 freely via a network 4 such as the Internet. The device 2 is a user-owned device. The device 2 is composed of, for example, a smartphone, a tablet terminal, a notebook computer, or the like. The device 3 is a terminal possessed by a music provider. The device 3 is composed of a personal computer such as a notebook personal computer, a smartphone, a tablet terminal, and the like.

In such a configuration, the server apparatus 1 accepts the music registration request from the device 3, and registers the music data in the database in association with the 5W1H information input at the time of uploading. In addition, the server apparatus 1 accepts a music search request from the device 2, performs a search by referring to the DB using the 5W1H information as a search keyword, and extracts music matching the user's preferences and circumstances. Then, the server device 1 urges the extracted information to be displayed on the device 2 in the form of a list so that it can be viewed. In the device 2, as a result of listening, favorite songs can be registered in the library. The server apparatus 1 also centrally manages library information for each user. When registering a song to the library, the content of the DB is updated so that the keyword used when extracting the song is added as new 5W1H information.

Figure 2:
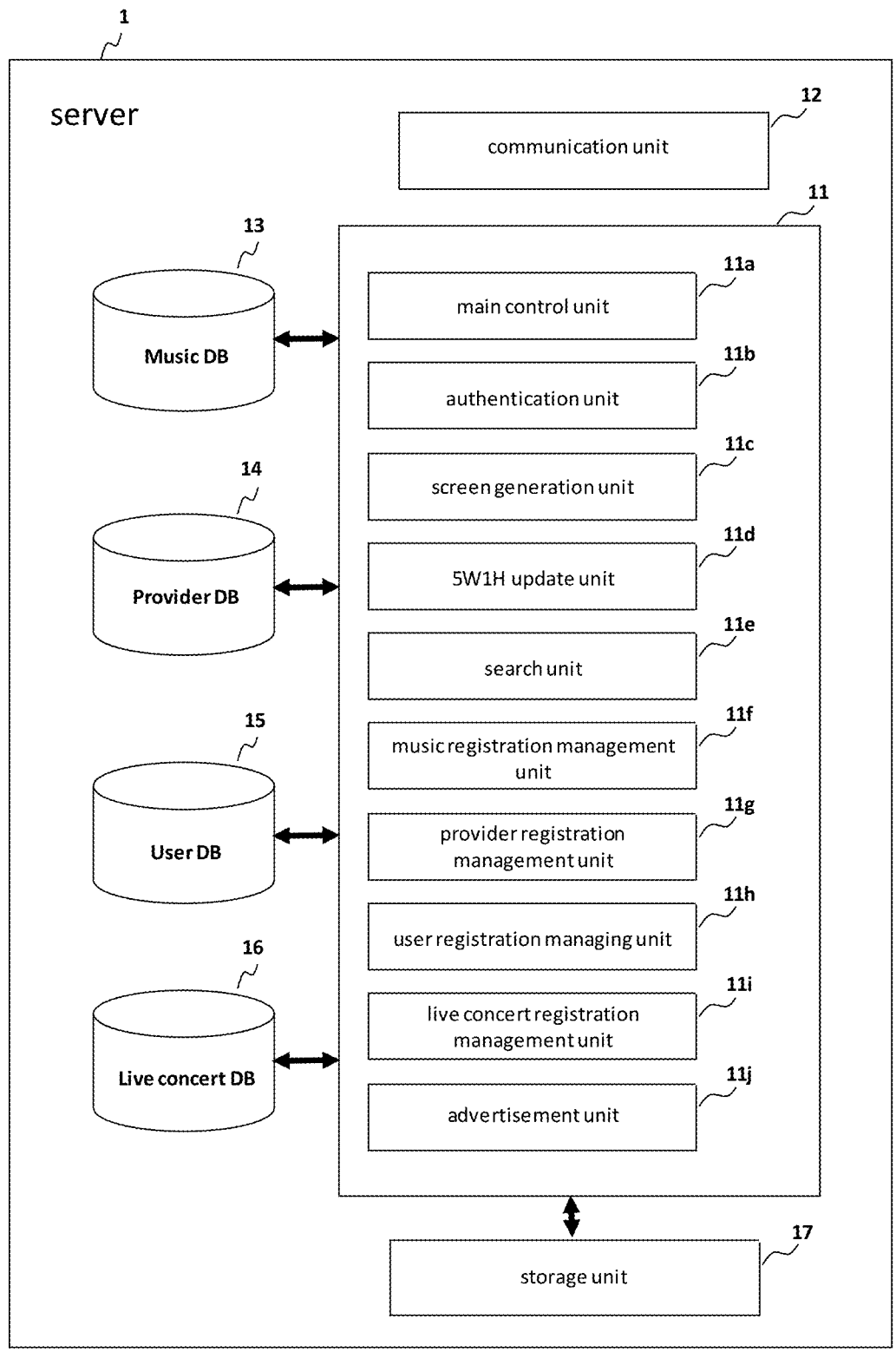
FIG. 2 is a configuration diagram of a server apparatus according to a first embodiment of the present invention.

FIG. 2 shows a detailed configuration example of the server device 1 in the music search system according to the first embodiment of the present invention.

As shown in FIG. 1, the server apparatus 1 includes a control unit 11 including a CPU (Central Processing Unit) or the like that controls the entire system. The control unit 11 is communicably connected to the communication unit 12, the music database (abbreviated as DB hereinafter) 13, the provider DB 14, the user DB 15, the live concert DB 16, and the storage unit 17. Then, the control unit 11 reads and executes the control program stored in the storage unit 17 to thereby execute the main control unit 11 *a*, the authentication unit 11 *b*, the screen generation unit 11 *c*, the 5W1H update unit 11 *d*, the search unit 11 *e*, the music registration management Unit 11 *f*, a provider registration management unit 11 *g*, a user registration management unit 11 *h*, a live concert registration management unit 11 *i*, and an advertisement unit 11 *j*.

In such a configuration, the communication unit 12 communicates with the devices 2, 3 via the network 4.

The music DB 13 stores a music management table, and manages various pieces of information related to the music in association with each other. An example of the composition of the music management table is shown in FIG. 3.

As shown in FIG. 3, in the music management table, the music ID, the provider ID, the name (title) of the music, the 5W1H information, the songwriters, the composers, the lyrics, the number of play, the number of library registrations, the weather information and GPS information are associated and stored. The music ID is identification information automatically added when uploading music. The provider ID is identification information automatically added when the music provider registers. Here, the provider ID is associated when the provider uploaded the song. The 5W1H information is information input by the device 3 by the provider when uploading the music. 5W1H information includes keywords when, where, who(m), what, why, and how. The number of registered libraries means the number of users who register the music in their library. The weather information is information indicating weather at the time of registration of the user who registered the music in the library. The GPS information is information indicating the GPS position at the time of registration of the user who registered the music in the library.

A provider management table is stored in the provider DB 14, and various information relating to the song provider is associated and managed. An example of the configuration of the provider management table is as shown in FIG. 4.

As shown in FIG. 4, in the provider management table, the provider ID, the birth date of the provider, the sex, the payee information, the name, the display name, the image, the live concert ID, and the music ID are associated and stored. The provider ID is identification information automatically added when the provider registers as a service user. The payee information means a bank transfer account etc. of a payment destination of remuneration accompanying viewing of music and the like. The display name is a name or a name used when displayed as being associated with a song provider. The image means image data relating to the music provider himself or a band etc. belonging to. Although the details will be described later, the live concert ID is identification information given to the live concert information, and a live concert ID for identifying the live concert information provided by the music provider is stored in association. Likewise, with respect to the music ID, the music ID related to the music uploaded by the music provider is associated and stored.

A user management table is stored in the user DB 15, and various information relating to the user who receives the service is associated and managed. An example of the configuration of the user management table is as shown in FIG. 5.

As shown in FIG. 5, in the user management table, the user ID, the birth date of the user, the sex, the name, the display name, the image, the password, the library information, and the provider ID are stored in association with each other. The user ID is identification information automatically added when the user registers as a service user. The display name is a name when displayed as a service user in a site established by the server apparatus 1. The password is a password for receiving authentication at the server apparatus 1 and is set at the time of user registration. The library information is information for specifying a favorite music among music that he/she listened, and is registered according to the music ID. The provider ID is associated with the provider ID when the user is also the song provider.

The live concert information management table is stored in the live concert DB 16, and the live concert information registered by the music provider is managed. An example of the configuration of the live concert information management table is as shown in FIG. 6.

As shown in FIG. 6, in the live concert information management table, live concert ID, provider ID, song ID, date and time, place, ticket fee, number of people to be accommodated, and other information are stored in association with each other. The live concert ID is identification information automatically added when live concert information is registered. The provider ID is the provider ID of the provider who registered the live concert information. The music ID is the ID of the music to be demonstrated at the live performance. The date and time are the live concert date and time, the place is the place where live concert is held, the ticket fee is the price of the live ticket, and the number of people is the capacity of the live concert.

Returning to FIG. 2 again, the storage unit 17 is composed of, for example, a RAM (Random Access Memory), a ROM (Read Only Memory), a HDD (Hard Disk Drive), etc. and stores control programs and executes control the work area of the part 11 is provided.

In the control unit 11, the main control unit 11 *a* governs various kinds of overall control such as controlling communication via the communication unit 12. The authentication unit 11 *b* accepts the authentication request from the devices 2 and 3 and executes predetermined authentication using the ID and the password. The screen generating unit 11 *c* generates HTML data which make the screen on the devices 2 and 3 display. The 5W1H update unit 11 *d* updates the 5W1H information stored in association with the music ID based on the data transmitted from the devices 2 and 3. The search unit 11*e* searches for songs matching the user's taste and situation from the music DB based on 5W1H information and the like.

The music registration management unit 11 *f* assigns a music ID to the music, and registers and manages the music in association with the music ID in the music DB 13. The provider registration management unit 11 *g* assigns the provider ID to the provider and registers and manages provider information in association with the provider ID in the provider DB 14. The user registration management unit 11 *h* assigns a user ID to the user, registers and manages the user information in the user DB 15 in association with the user ID. The live concert registration management unit 11*i* assigns a live concert ID to the live concert information, registers the live concert information in the live concert DB 16 in association with the live concert ID, and manages it. The advertisement unit 11 *j* manages information of advertisements to be displayed on the device 2 of the user, for example, at the time of listening to a music.

Figure 7:
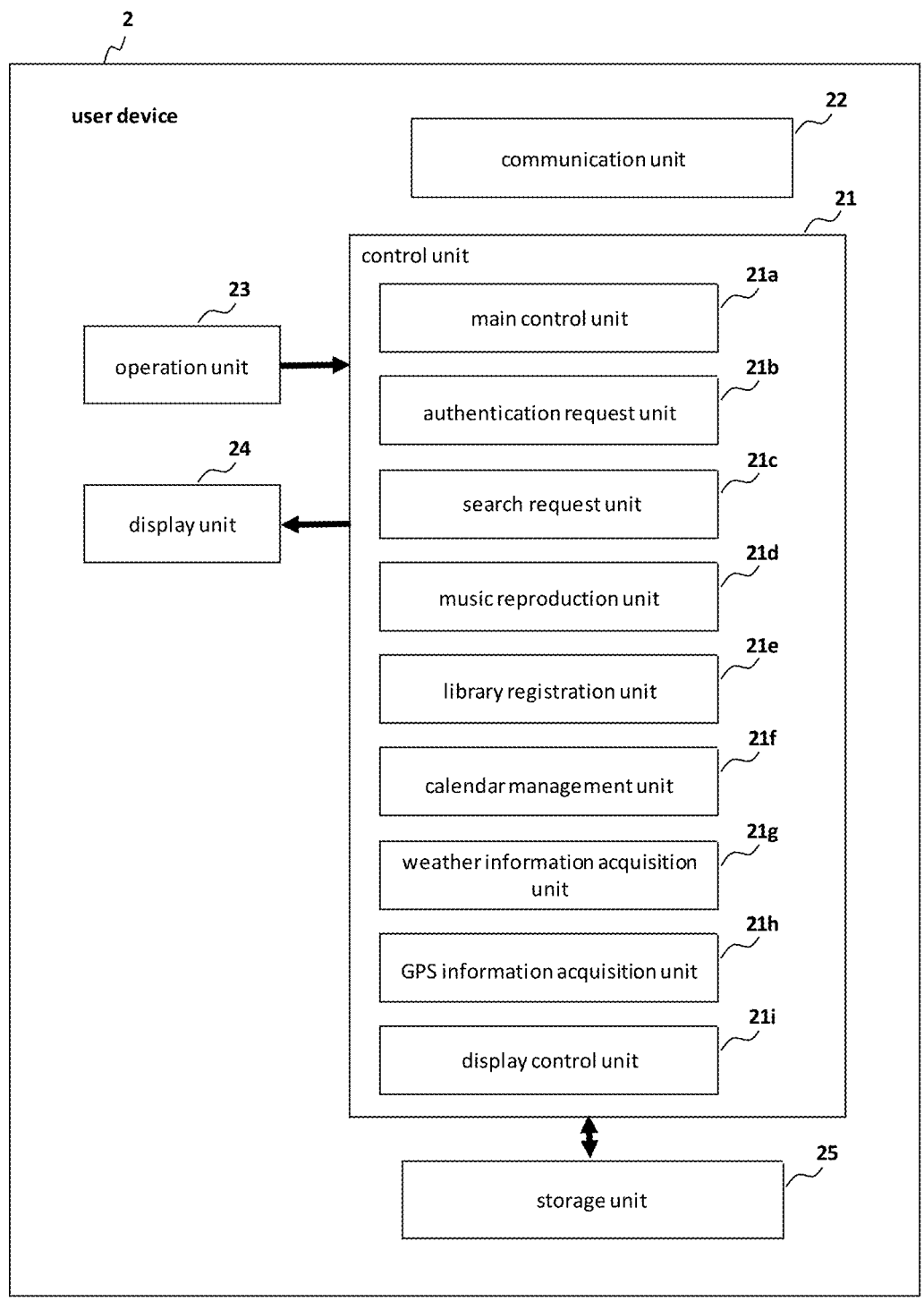
FIG. 7 is a configuration diagram of a device according to a first embodiment of the present invention.

FIG. 7 shows a detailed configuration example of the device 2 possessed by the service user in the music search system according to the first embodiment of the present invention.

As shown in the FIG. 7, the device 2 is equipped with a control 21 that governs overall control. The control unit 21 is communicatively connected to the communication unit 22, the operation unit 23, the display unit 24, and the storage unit 25. The operation unit 23 and the display unit 24 may be integrated as a touch panel. By reading and executing the program of the storage unit 25, the control unit 21 can control the main control unit 21 *a*, the authentication request unit 21 *b*, the search request unit 21 *c*, the music reproduction unit 21 *d*, the library registration unit 21 *e*, the calendar management unit 21 *f*, the weather information acquisition Unit 21 *g*, a GPS information acquisition unit 21 *h*, a display control unit 21 *i*.

In such a configuration, the communication unit 22 communicates with the server device 1 and the like. The operation unit 23 accepts various operations, and conceptually includes a mouse, a keyboard, and the like. The display unit 24 performs various displays, and conceptually includes an LCD display or the like. As described above, when the operation unit 23 and the display unit 24 are configured by a touch panel, by tapping buttons on the screen while watching the guide screen displayed on the display unit 24, a desired operation input will be done. The storage unit 25 is composed of, for example, a RAM, a ROM, an HDD, and the like, and stores a control program, and provides a work area of the control unit 21 at the time of program execution.

In the control unit 21, the main control unit 21 *a* governs overall control such as communication via the communication unit 22. When logging in to the website provided by the server device 1, the authentication requesting unit 21 *b* requests authentication by ID and password. The search request unit 21 *c* requests the server apparatus 1 to search based on 5W1H information or the like, for example. The music reproducing unit 21 *d* reproduces a music as a search result provided from the server device 1, or a desired music from the library or the like. The library registering unit 21*e* registers the song in its library when the user likes the songs specified by the operation of the operation unit 23. The display control unit 21 *i* controls display of images by the display unit 24.

In addition to the above, the calendar management unit 21 *f* manages calendar information such as the user's schedule on the calendar. The weather information acquisition unit 21 *g* periodically acquires and holds weather information from an external website or the like. The GPS information acquisition unit 21 *h* acquires and holds position information from a GPS or the like. Although details will be described later, these calendar information, weather information, and position information may be used for evaluation of songs, updating of 5W1H information, and the like. Details thereof will be described in detail in the second embodiment and the following.

Figure 8:
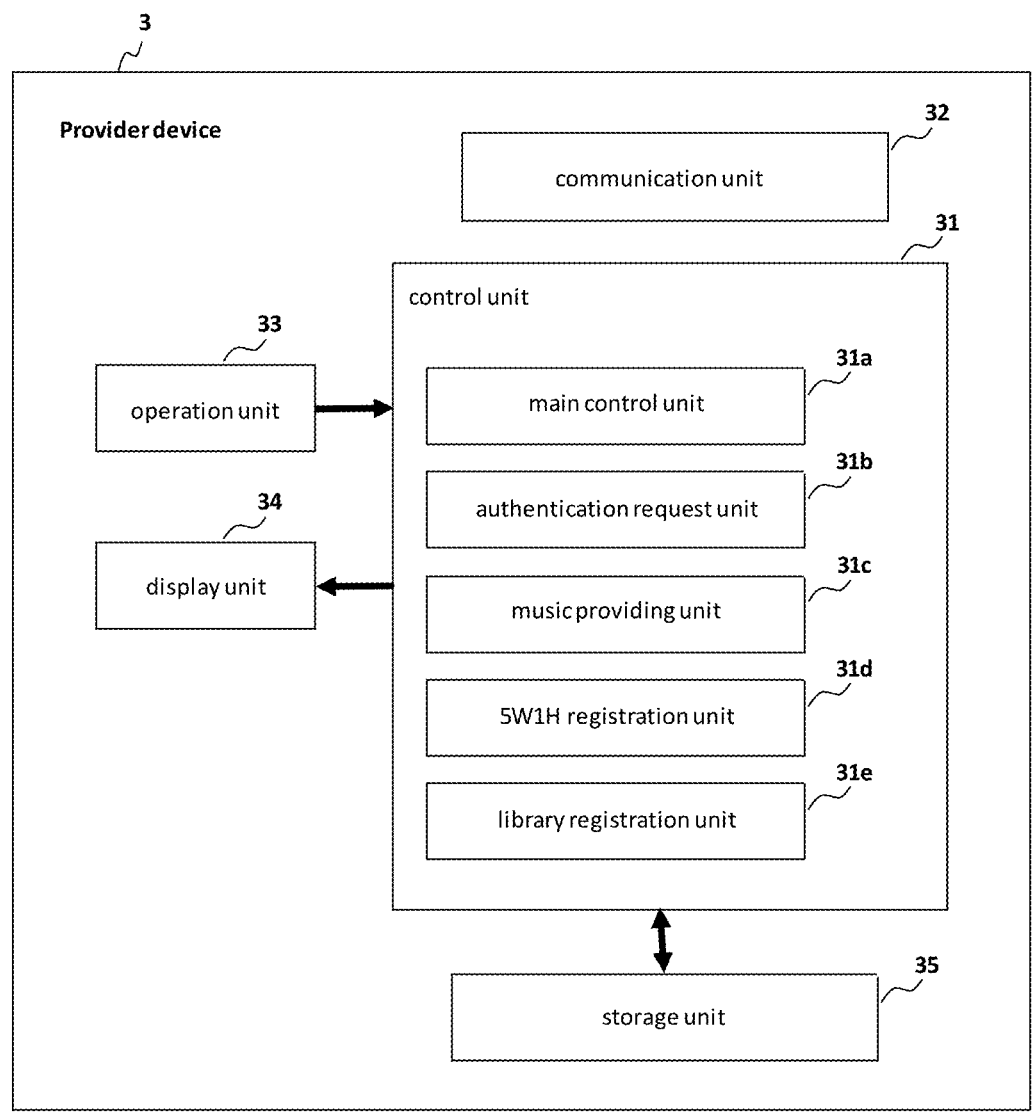
FIG. 8 is a configuration diagram of a device according to a first embodiment of the present invention.

FIG. 8 shows a detailed configuration example of the device 3 possessed by the music provider in the music search system according to the first embodiment of the present invention.

As shown in FIG. 8, the device 3 is provided with a control 31 for controlling the whole. The control unit 31 is communicably connected to the communication unit 32, the operation unit 33, the display unit 34, and the storage unit 35. The operation unit 33 and the display unit 34 may be integrated as a touch panel. By reading and executing the program of the storage unit 35, the control unit 31 functions as a main control unit 31 *a*, an authentication request unit 31 *b*, a music provision unit 31 *c*, a 5W1H registration unit 31 *d*, a display control unit 31 *e*, and the like.

In such a configuration, the communication unit 32 communicates with the server device 1 and the like. The operation unit 33 accepts various operations, and conceptually includes a mouse, a keyboard, and the like. The display unit 34 performs various displays, and conceptually includes an LCD display or the like. As described above, when the operation unit 33 and the display unit 34 are configured by a touch panel, by tapping buttons or the like on the screen while watching the guidance screen displayed on the display unit 34, desired operation input will be done. The storage unit 35 is made up of, for example, a RAM, a ROM, an HDD, etc., and stores a control program, and provides a work area of the control unit 31 at the time of program execution.

In the control unit 31, the main control unit 31 *a* governs overall control such as communication via the communication unit 32. When logging in to the website provided by the server apparatus 1, the authentication requesting unit 31 *b* requests authentication by ID and password. The music providing unit 31 *c* uploads music to the server device 1. The 5W1H registering unit 31 *d* registers information of 5W1H related to the song at the time of providing the song or the like. The display control unit 31 *e* controls display of images and the like by the display unit 34.

Figure 9:
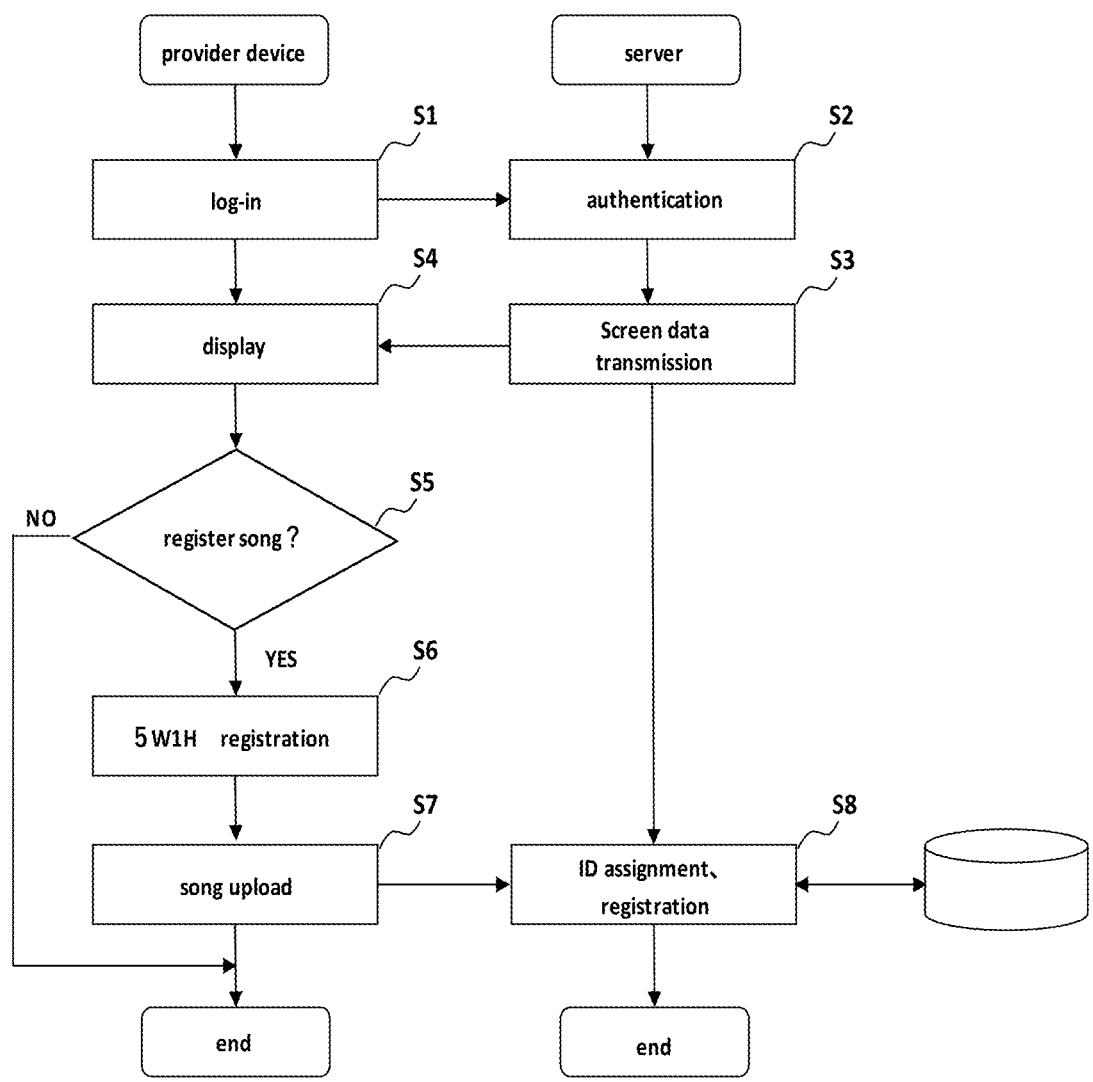
FIG. 9 is a flowchart showing in detail the procedure of music registration in the music search system according to the first embodiment of the present invention.
Figure 10:
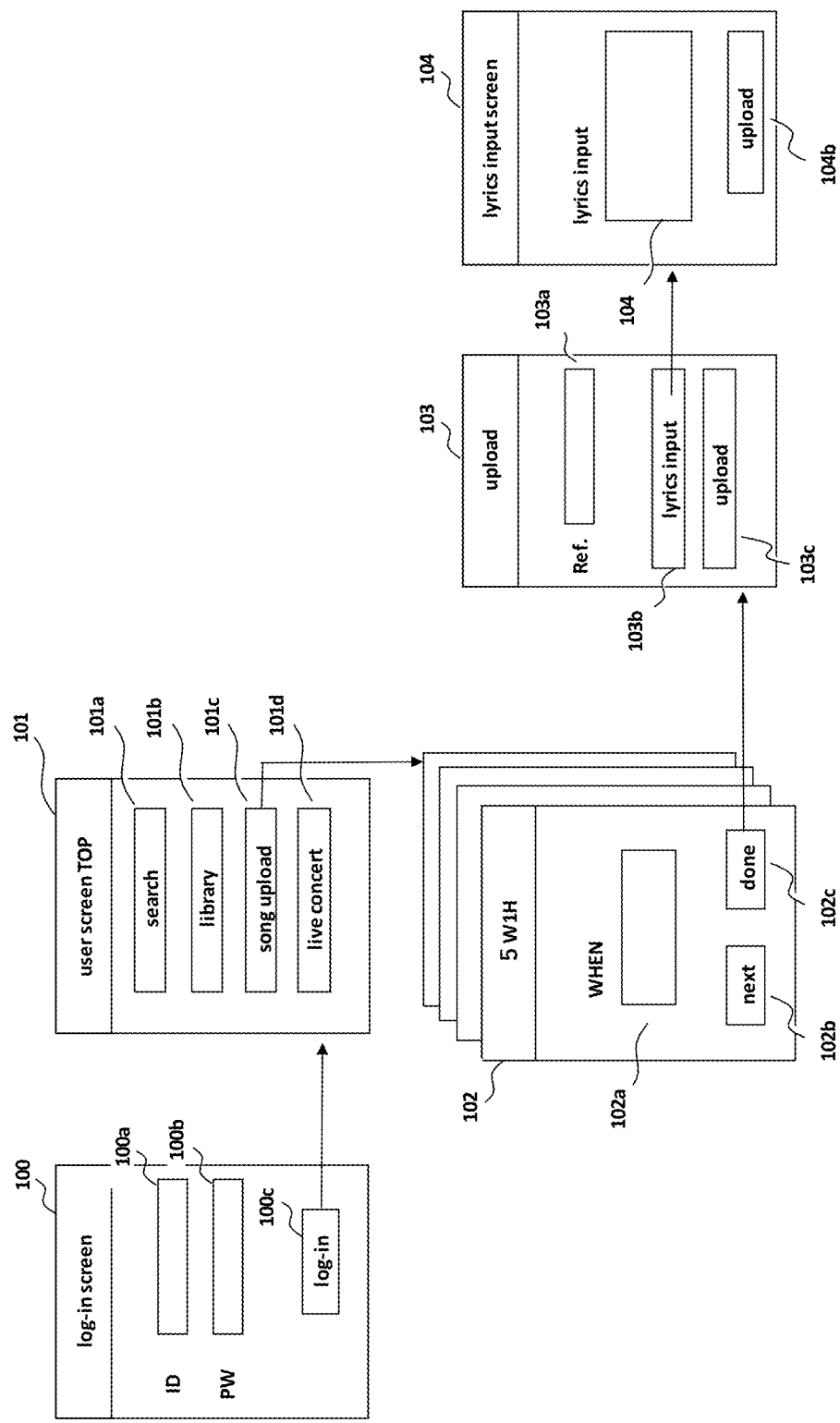
FIG. 10 is a screen transition diagram illustrating a process of music registration.

Hereinafter, with reference to the flowchart of FIG. 9, the flow of music registration processing in the music search system according to the first embodiment of the present invention will be described in detail. In the following description, the screen transition diagram of FIG. 10 is appropriately referred to. Note that this processing procedure corresponds to at least a part of the music search method according to the first embodiment of the present invention.

Upon starting the process, the provider ID is input to the area 100 *a* of the login screen 100 displayed on the display unit 34 of the device 3, the password is input to the area 100 *b*, and the login button 100 *c* is tapped. As a result, the authentication request unit 31 *b* issues an authentication request to the server apparatus 1 (S 1). Upon receiving this authentication request, the server device 1 refers to the provider DB 14 and performs authentication using the provider ID and password (S 2). Then, when the authentication is established, the screen generation unit 11 *c* generates HTML data related to the user screen 101 and transmits it to the device 3 under the control of the main control unit 31 *a* (S 3).

In the device 3, upon receiving this HTML data via the communication unit 32, the display unit 34 displays the user screen 101 under the control of the display control unit 31 *e* (S 4). On the user screen 101, a search button 101 *a*, a library button 101 *b*, a song upload button 101 *c*, and a live concert information button 101 *d* are displayed. When the music upload button 101 *c* is selected on this user screen 101 (Yes in S 5), under the control of the display control unit 31 *e*, the display unit 34 displays the screen 102. And the six screens relating to the 5W1H information are displayed while selecting the button 102 *b*, and input of 5W1H information to each area 102 *a* (S 6). When the confirm button 102 *c* is selected, the display unit 34 displays the upload screen 103.

On the upload screen 103, the reference file is specified in the area 103*a*. In the case of inputting lyrics, by selecting the lyrics input button 103 *b*, switching to the lyrics input screen 104 is performed and the lyrics input to the area 104 *a* is accepted. When the upload button 103 *c* on the upload screen 103 or the upload button 104 *b* on the lyrics input screen 104 is selected, the music providing unit 31 *c* uploads music to the server device 1 (S 7). Upon uploading music to this server device 1, it also transmits the 5W1H information previously inputted.

In the server device 1, when the communication unit 12 receives the music data and 5W1H information, the music registration management unit 11 *f* assigns the music ID to the music and adds the music ID to the music DB 13, music data, 5 WIH information, and information related to the provider (S 8). In this way, a series of processing relating to music registration is completed.

Next, with reference to the flowchart of FIG. 11, the flow of music search processing in the music search system according to the first embodiment of the present invention will be described in detail. In the following description, the screen transition diagram of FIG. 12 is appropriately referred to. Note that this processing procedure corresponds to at least a part of the music search method according to the first embodiment of the present invention.

Upon starting the process, a user ID is input to the area 100 *a* of the login screen 100 displayed on the display unit 24 of the device 2, a password is input to the area 100 *b*, and the login button 100 *c* is tapped. As a result, the authentication request unit 21 *b* issues an authentication request to the server apparatus 1 (S 11). Upon receiving this authentication request, the authentication unit 11 *b* refers to the user DB 15 and performs authentication using the user ID and the password (S 12). Then, when the authentication is established, the screen generation unit 11 *c* generates HTML data related to the user screen 101 and transmits it to the device 2 under the control of the main control unit 31 *a* (S 13).

In the device 2, upon receiving this HTML data via the communication unit 22, the display unit 24 displays the user screen 101 under the control of the display control unit 21 *i* (S 14). On the user screen 101, a search button 101 *a*, a library button 101 *b*, a music upload button 101 *c*, and a live concert information button 101 *d* are displayed. When the search button 101 *a* is selected on this user screen 101 (Yes in S 15), the display unit 24 displays the search screen 105 under the control of the display control unit 21 *i*. Then, when a keyword for each of 5W1H is entered in the area 105 *a*, the next button 105 *b* is selected and switched to the input screen of 5W1H, respectively, and the enter button 105 *d* is selected, the search request unit 21 *c* sends the search request (S16).

Upon receiving this search request, the server 1 executes a search and extracts the corresponding music from the music DB 13 (S17). Then, the screen generation unit 11 *c* generates HTML data of the music list related to the extracted music group and transmits it to the device 2 (S 18).

In the device 2, upon receiving this HTML data, the display unit 24 displays the search result list screen 106 under the control of the display control unit 21 *i* (S 19). On the search result list screen 106, songs matching the user's preferences and circumstances are enumerated so that the playing target can be selected. When a desired song is selected from the enumerated songs and the play button 106 *a* is selected, the display unit 24 displays the playing screen

107, and the song playback unit 21 *d* plays the music (S 20). On the playing screen 107, a gauge 107 *a* indicating the progress of playing is displayed, in the area 107 *b*, lyrics are displayed when there is lyrics, and advertisements are displayed in the area 107 *c*.

When the library registration button 107 *d* is selected on the playing screen 107, the display unit 24 displays the library registration screen 108. Then, when the registration button 108 *b* is selected after the user confirms the registration target in the display of the area 108 *a* of the library registration screen 108, the library registration unit 21 *e* requests the server device 1 to register the library (S21). Upon receipt of this library registration request, the user registration managing unit 11 *h* updates the information in the user DB 15, and the 5W1H update unit 11 *d* accesses the music DB 13 and searches for the songs registered in the library 5W1H information is updated (S 22). In this way, a series of processing relating to music search ends.

As described above, in the music search system according to the present embodiment, music and 5W1H information are associated with each other and stored in the music DB 13. When searching for songs, it is possible to retrieve and extract songs matching the user's preferences and circumstances based on 5W1H information. For example, when a year in which a user is born is input as a keyword of "When", the music whose 5W1H information is concerned is extracted. Furthermore, when "Beach" is input as a keyword of "Where"", the music whose 5W1H information is the beach is extracted. When both of them are entered, music related to the beach hit in the year is extracted. In addition, similar logic is extracted for "What," "Why," and "How".

About 5W1H information, you can set priority to "When", "Where", "Who(m)", "What", "Why", "How".

Also, in order to measure the degree to which music matches the user's preferences and circumstances, for example, "Number of searched words/Total number of related words"×number of playing" is scored for each music, and user preferences, it may be preferentially extracted as having a high degree of matching to the music list and displayed on the music list.

For example, a case where "beach" is input as a keyword related to 5W1H by a user at the time of search will be exemplified. Suppose that 100 keywords are registered as keywords related to "beach", such as "Florida" "Floating wheel" "Shaved ice" and so on. When 5 of the 100 registered keywords are registered as 5W1H information in music A, and when the number of playing is 100, the scoring of song A is as follows.

Rating of music $A = (5/100) \times 100 = 5$ points

On the other hand, for a certain music B, when 20 of the 100 registered keywords is registered as 5W1H information, and when the play count is 50, the score of music B is as follows.

Score of song $B = (20/100) \times 50 = 10$ points

Accordingly, in this case, the music B is extracted with priority over the music A as the music matching the user's preference and situation. Even if both of them are extracted as matching, the device displays the music B more preferentially than the music A when displaying the search result list.

5W1H information relating to the music is registered when the music is uploaded by the provider, but in the present embodiment, when the music is registered in a library in the device 2, in the server apparatus 1, user registration managing unit 11 *h* updates the information of the user DB 15 and the 5W1H update unit 11 *d* accesses the music DB 13 to update the 5W1H information of the music registered in the library.

That is, the more 5W1H information of songs are added as they are registered in the library. For example, even when the keyword "beach" has been registered as the information of "Where" at the time of registration, as a result of the user searching with the keyword "tropical island", the user searches for the list in the obtained search result list Is selected, and when the library is registered, "tropical island" is added as new 5W1H information of the song. In this way, as the number of listeners increases as listening increases, as 5W1H information is added as more information is registered in the library, opportunities to be extracted by the search also increase, and also in the search result list the possibility that it will be displayed will increase.

Figure 13:
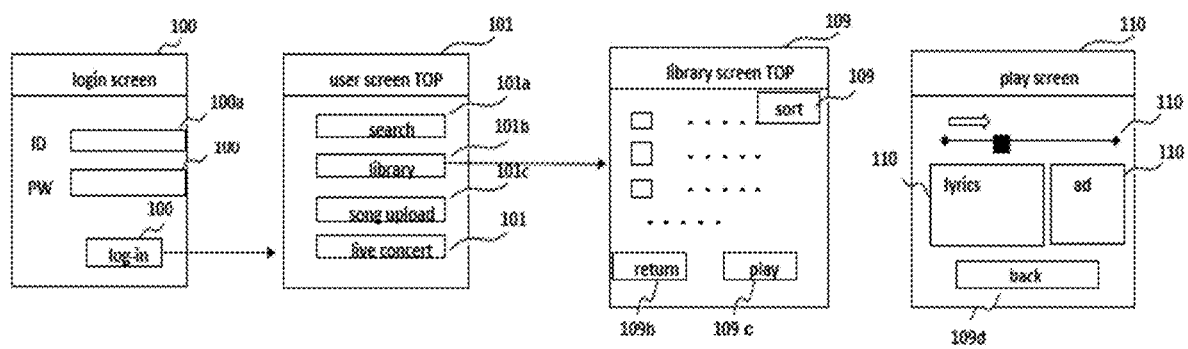
FIG. 13 is a screen transition diagram illustrating a process of confirming a library.

Next, in the device 2, the screen transition when the user listens to the music registered in the library is as shown in FIG. 13.

When the library button 101 *b* is selected on the user screen 101, the library screen 109 is displayed on the display unit 24. On this screen, songs registered in the library are enumerated, and it is also possible to sort by the sort button 109*a*. When the return button 109 *b* is selected, the process returns to the user screen 101. When the play button 109 *c* is selected after the music is selected, the play screen 110 is displayed on the display unit 24 and is playable. On this play screen 110, a gauge unit 110*a* showing the degree of progress of music reproduction is displayed, further, an area 110*b* for displaying lyrics and an area 110*c* for displaying advertisement are provided under the lyrics. Then, a back button 110 *d* is provided, and when the return button 110 *d* is selected, the screen is switched to the library screen 109.

As described above, according to the first embodiment of the present invention, a music search system comprising the user's device 2 and the server device 1 is provided. The user's device 2 is provided with a search requesting section 21 *c* which receives an input of 5W1H information and makes a search request of a music, a music reproducing section 21 *d* which reproduces a music, and a library registering section 21 *e* which registers a desired music in a library. The server device 1 includes a music DB 13 as a music storage unit in which music data, 5W1H information, and the play counts are stored in association with each other, a search unit 11 *e* for searching for music based on a search request from the user's device 2, A screen generation section 11 *c* for generating image data for displaying the search results in a list format, and a 5 WIH update section 11 *d* for updating the 5W1H information. Then, when registering the music in the library, the library registering unit 21 *e* of the user's device 2 transmits the 5W1H information used at the time of searching the music to the server device 1, the 5W1H updating unit 11 *d* of the server device 1 transmits the 5W1H information and updates the 5W1H information of the music DB 13 as the music storage unit based on the 5W1H information that has been made.

Here, the searching unit 11*e* refers to the music DB 13 as a music storage unit, counts the number of search characters included in the 5W1H information of each music by the total number of registered keywords relating to the 5W1H information input at the time of searching in the user's device 2 as after dividing, the score may be multiplied by the play counts of each music, and the matching music may be extracted based on the rating point.

Furthermore, as will be described in the second to fourth embodiments in detail, the searching unit 11 *e* acquires, in addition to the 5W1H information input at the user's device 2 at the time of search, at least either the position information, the weather information, or the calendar information It is good to extract matching songs based on which one.

According to a first embodiment of the present invention, in a method using a music search system including a user's information terminal and a server device, the user's device 2 receives a 5W1H information input request and makes a search request for a music, A step of registering a desired music in a library, a step of executing a search of music on the basis of a search request from the user's device 2 by the server device 1, and generating image data for displaying the search result in a list form, The 5W1H information is updated, and when registering the music in the library, the user's device 2 transmits the 5W1H information used for the search of the music to the server device 1, and the server device 1 transmits, The 5W1H information of the music DB 13 as the music storage section is updated based on the transmitted 5W1H information.

In addition to this, it is a program to be executed by the server apparatus 1 having a music DB 13 as a music storage section which is freely communicable with the user's information terminal 1 and stores music data, 5W1H information, and the number of viewers in association with each other The server apparatus 1 includes a searching section 11 e for searching for music on the basis of a search request from the user's device 2, a screen generating section 11 c for generating image data for displaying the search result in a list form, a music memory As the 5W1H updating section 11 d for updating the 5W1H information of the music DB 13 as the section, when the user's device 2 registers the music in the library, receives the 5W1H information used at the time of searching the music, the 5W1H updating section 11 d A program for updating the 5W1H information of the music DB 13 as the music storage section is provided based on the 5W1H information that has been received. But as a computer-readable storage medium storing such a program.

Therefore, according to the first embodiment, it is possible to accurately extract music conforming to the user's preferences and circumstances based on 5W1H information. Furthermore, when songs are registered in the library at the user's information terminal, the 5W1H information on the songs is updated on the side of the server device, so that the latest evaluation of the songs on the market reflecting the evaluation after the songs are uploaded Since it is possible to conduct a search based on 5W1H information, it is highly reliable.

Second Embodiment

Next, a second embodiment of the present invention will be described.

Figure 11:
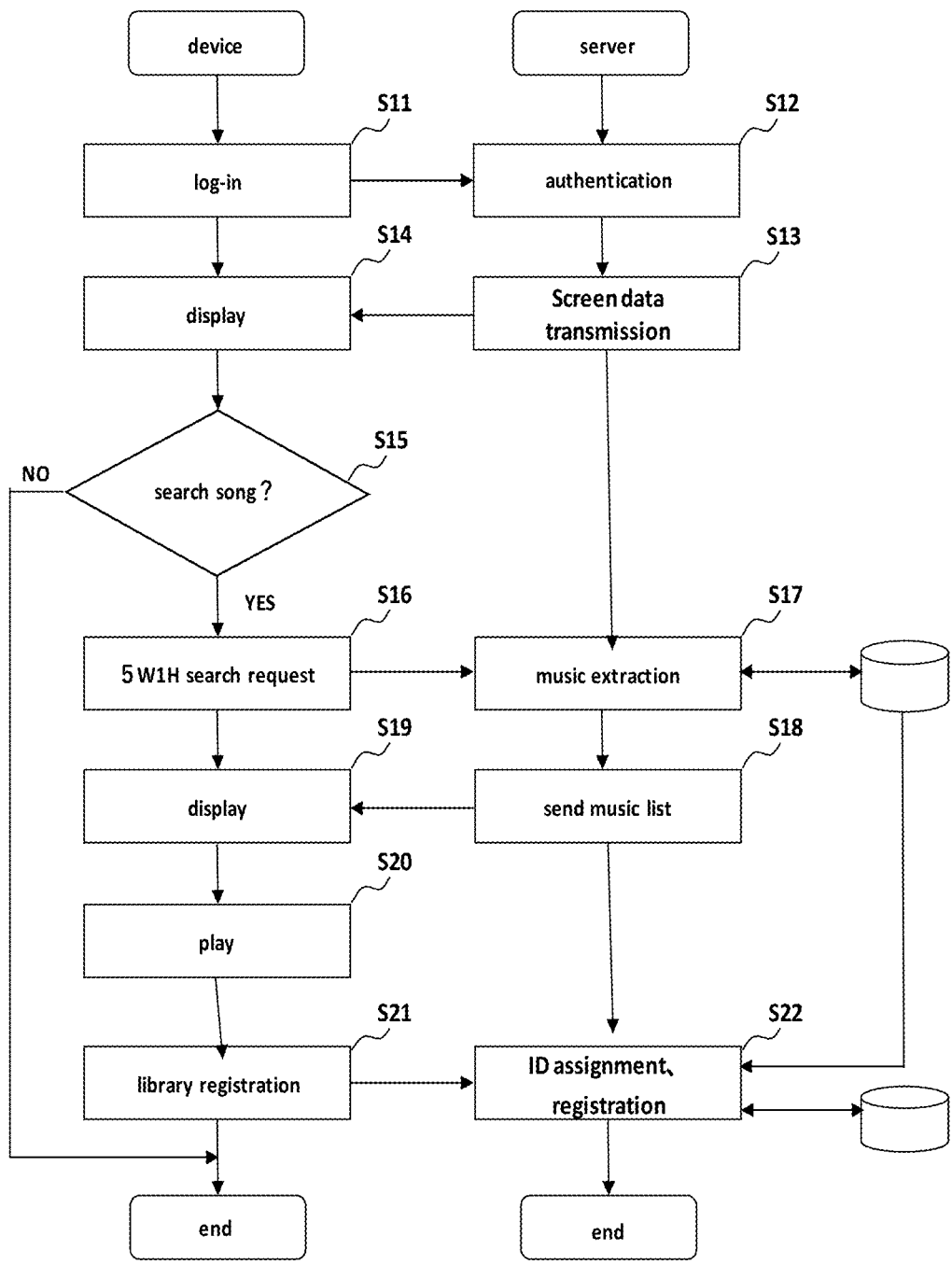
FIG. 11 is a flowchart showing in detail a processing procedure relating to music search in the music search system according to the first embodiment of the present invention.
Figure 12:
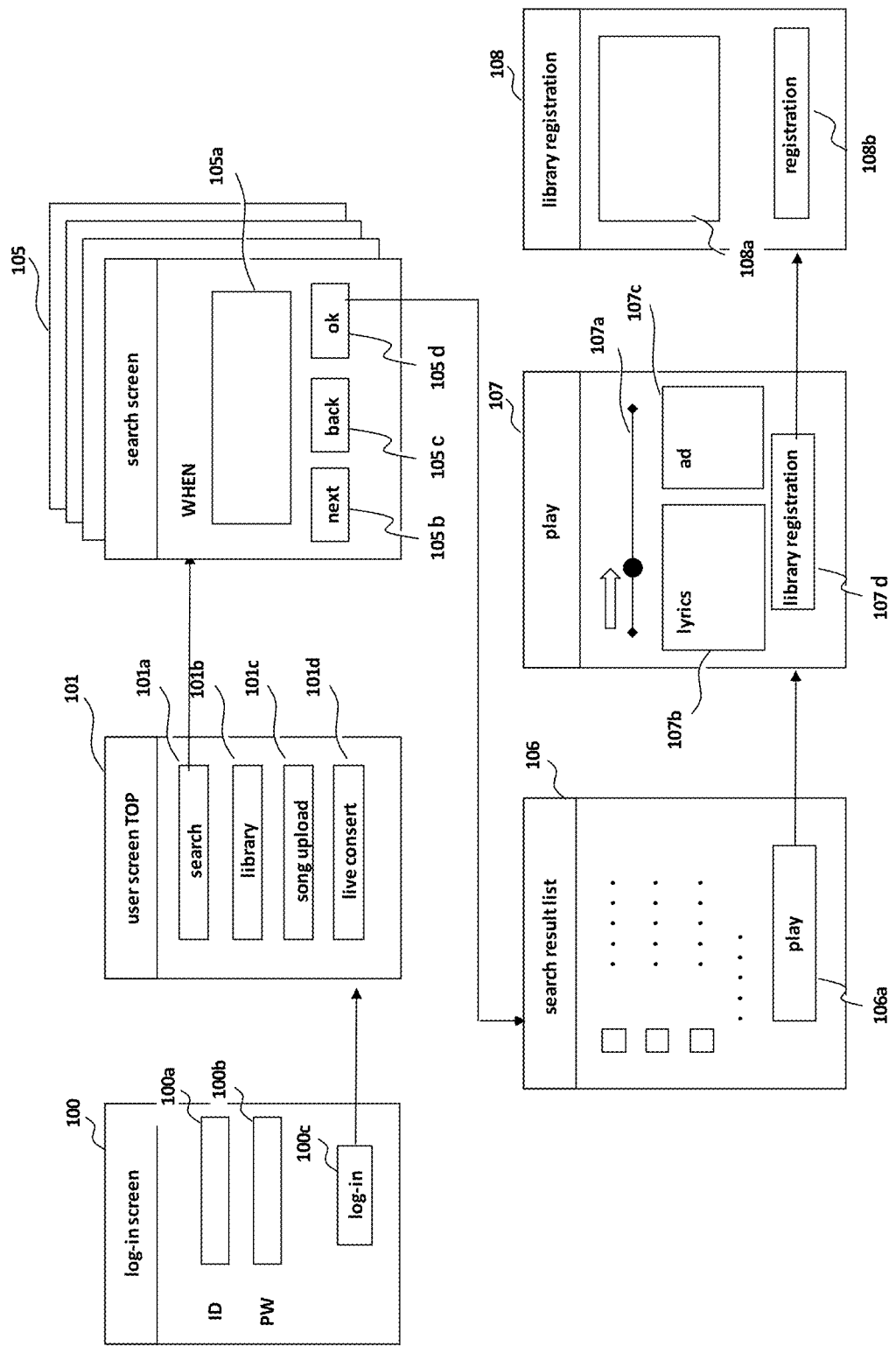
FIG. 12 is a screen transition diagram illustrating a process of music search.

The configuration and operation of the music search system according to the second embodiment of the present invention is substantially the same as that of the first embodiment, but in the processing procedure related to the music search of FIG. 11, the calendar management unit 21 f of the device 2 refers to the schedule in the user's calendar and uses it for song search.

That is, in the processing procedure of FIG. 11, when inputting 5W1H information and making a retrieval request in step S15, the calendar management unit 21 f refers to the schedule in the calendar etc., When the keyword schedule is before and after the search, the calendar information together with the 5W1H information is transmitted to the server device 1 at the time of the search request.

For example, when the birthday is input within the schedule within a few days of the search date, the device 2 transmits calendar information with the keyword "birthday" as the keyword together with the 5W1H information to the server device 1. The keywords to be recognized as calendar information are predetermined in the device 2, and may be stored in a table form in the storage unit 25.

In the server device 1, in searching for music, the search is executed in addition to the 5W1H information taking into account the calendar information. Therefore, when a keyword "birthday" becomes a search keyword as calendar information in addition to 5W1H information, an effect of recalling a birthday of a friend not conscious can be expected through the extracted music.

Incidentally, as keywords to be recognized as the calendar information, various things such as "birthday", "watching sports", "concert", "drive", "date", "dinner", etc. can be set Of course it is possible.

As explained above, according to the second embodiment of the present invention, since the search can be performed by adding the calendar information in addition to the 5W1H information, even if the user has a subconscious mind but it is formalized at the time of input It is possible to perform a search with the keywords not added.

Third Embodiment

Next, a third embodiment of the present invention will be described.

The configuration and operation of the music search system according to the second embodiment of the present invention is substantially the same as that of the first embodiment, but in the processing procedure related to the music search of FIG. 11, the GPS information acquisition unit 21 h Has acquired user's GPS position information and uses it for song search.

That is, in the processing procedure of FIG. 11, when a search request is made by entering 5W1H information in step S15, the GPS information acquisition unit 21 h acquires the position information of the user, and together with the 5W1H information, the position And transmits the information to the server device 1 at the time of search request.

In the server device 1, in searching for music, the search is executed in addition to the 5W1H information taking into account the position information. When the position information corresponds to a place registered beforehand, the search is executed by adding the keyword relating to the place to the 5W1H information. The relationship between the location information and the registered location is managed in the user management table.

As a matter of course, it is possible to set various items such as "company", "home", "park", "tennis court", etc. as the registration place corresponding to the position information.

As explained above, according to the third embodiment of the present invention, it is possible to retrieve songs in addition to 5W1H information in addition to the position information at the time of retrieval by the user, so that extraction of songs matching the situations It is possible to proceed.

Fourth Embodiment

Next, a fourth embodiment of the present invention will be described.

The configuration and operation of the music search system according to the second embodiment of the present invention is substantially the same as that of the first embodiment, but in the processing procedure related to the music search of FIG. 11, the weather information acquisition unit 21 g Has acquired weather information and uses it for song search.

That is, in the processing procedure of FIG. 11, when inputting 5W1H information and making a search request in step S15, the weather information acquiring unit 21 g acquires the weather information of the current position from the external site and transmits 5W1H information Together with the weather information, to the server apparatus 1.

Since the weather information is classified in advance into several keywords such as "sunny", "cloudy", "rain", "snow", in the device 2, the weather information acquiring unit 21 g acquires weather information from the external site After acquiring it, it identifies it to any one of these several keywords and transmits weather information consisting of the keyword to the 5W1H information together with the server device 1 side. In the server apparatus 1, when searching for songs, search is executed taking into consideration weather information in addition to 5W1H information.

As described above, according to the fourth embodiment of the present invention, it is possible to perform searching with the weather information added in addition to the 5W1H information. Therefore, it is possible to search for qualified songs based on environmental factors that affect the user's feelings Can be extracted.

Although the embodiment of the present invention has been described above, it is needless to say that the present invention is not limited thereto but various improvements and modifications are possible without departing from the spirit thereof.

For example, various kinds of information can be added in addition to the position information, the weather information, and the calendar information as the information to be added to the 5W1H information at the time of music search.

EXPLANATION OF SIGN

1 . . . server, 2, 3 . . . device, 4 . . . network such as internet, 11 . . . control unit, 11 a . . . main control unit, 11 b . . . authentication unit, 11 c . . . screen generation unit, 11 d 5W1H update unit, 11 e . . . search unit, 11f . . . music registration management unit, 11g . . . provider registration management unit, 11h . . . user registration management unit, 11i . . . live concert registration management unit, 11j . . . advertisement unit, 12 . . . communication unit, 13 . . . music DB, 14 . . . provider DB, 15 . . . user DB, 16 . . . live concert DB, 17 . . . storage unit, 21 . . . control unit, 21a . . . main control unit, 21b . . . authentication request unit, 21c . . . search request unit, 21d . . . music reproduction unit, 21e . . . library registration unit, 21f . . . calendar management unit, 21g . . . weather information acquisition unit, 21h GPS information acquisition unit, 22 . . . communication unit, 23 . . . operation unit, 24 . . . display unit, 25 . . . storage unit, 31 . . . control unit, 31a . . . main control unit, 31b . . . authentication request unit, 31c . . . music providing unit, 31d . . . 5W1H registration unit, 32 . . . communication unit, 33 . . . operation unit, 34 . . . display unit, 35 . . . storage unit.

The invention claimed is:

1. A music search system comprising a user's information terminal and a server device, wherein the information terminal comprises:
a search requesting unit for receiving input of 5W1H information as search keywords and making a search request for at least one song matching the search keywords, wherein 5W1H represents when, where, who(m), what, why, how;
a music reproducing unit for reproducing the at least one song; and
a library registration unit for registering the at least one song to a library, wherein the server device comprises:
a music storage unit storing a plurality of songs in which, for each song, music data, 5W1H information, and a play count are stored in association with each other;
a search unit that executes the search request received from the information terminal by the server device;
a screen generating unit for generating image data displaying search results comprising the at least one song in a list format; and
an updating unit for updating corresponding 5W1H information stored at the server device for at the least one song, wherein when registering the at least one song in the library, the library registration unit of the information terminal transmits, to the server device, the inputted 5W1H information used when making the search request, and the updating unit of the server device updates the corresponding stored 5W1H information of the at least one song within the music storage unit based on the inputted 5W1H information transmitted by the library registration unit,
wherein the search unit refers to the music storage unit and divides a number of search characters included in the stored 5W1H information of the at least one song by a total number of search keywords related to the inputted 5W1H information used when making the search request, wherein a result of the division is multiplied by the corresponding play count to calculate a score for the at least one song, and wherein the at least one song is matched based on the score.

2. The music search system according to claim 1, wherein the search unit further matches the at least one song based on at least one of position information, weather information, and calendar information in addition to the inputted 5W1H information.

3. A method of a music search system comprising a user's information terminal and a server device, the method comprising:
at the information terminal:
receiving an input of 5W1H information as search keywords and making a search request for at least one song matching the search keywords wherein 5W1H represents when, where, who(m), what, why, how; and
registering the at least one song in a library; and
at the server device:
storing, at a music storage unit at the server device, a plurality of songs in which, for each song, music data, 5W1H information, and a play count are stored in association with each other;
executing the search request received from the information terminal by the server device;
generating image data for displaying search results comprising the at least one song in a list format; and
updating the corresponding 5W1H information stored at the server device for the at least one song, the updating comprising:
referring to the music storage unit and dividing a number of search characters included in the corresponding stored 5W1H information of the at least one song by a total number of search keywords related to the inputted 5W1H information used when making the search request;

scoring the at least one song by multiplying a result of the division by a corresponding play count; and matching the at least one song with the search keywords based on the scoring, wherein when registering the at least one song in the library, the information terminal transmits, to the server device, the inputted 5W1H information, and wherein the server device updates the corresponding stored 5W1H information based on the inputted 5W1H information.

4. A system comprising:

a music storage unit that is freely communicable with an information terminal of a user and in which, for each of a plurality of songs, music data, 5W1H information, and a play count are stored in association with each other, wherein 5W1H represents when, where, who(m), what, why, how;

a screen generation unit configured to generate image data for displaying results comprising at least one song in a list format generated from a search of music executed based on a search request from the information terminal; and an update unit configured to update corresponding stored 5W1H information of the at least one song, wherein when the information terminal registers the at least one song in a library, the update unit updates the corresponding stored 5W1H information used for the search of the at least one song within the music storage unit based on inputted 5W1H information transmitted from the information terminal, wherein the search unit refers to the music storage unit and divides a number of search characters included in corresponding stored 5W1H information of the at least one song by a total number of keywords related to the inputted 5W1H information used when making the search request, wherein a score for the at least one song is calculated by multiplying a result of the division by a corresponding play count, and wherein the at least one song is matched based on the score.

5. A hardware storage device having a program stored thereon and executable by a server device having a music storage unit that is freely communicable with an information terminal of a user and in which, for each of a plurality of songs, music data, 5W1H information, and a play count are stored in association with each other, such that when executed, the program causes the server device to perform at least the following:

execute, at a search unit associated with the server device, a search of music based on a search request received from a user, generate image data, at a screen generation unit associated with the server device, displaying search results comprising at least one song matching the search request in a list format; and update, by an updating unit associated with the server device, corresponding stored 5W1H information of the music storage unit, wherein when the information terminal registers the at least one song in the library, the server device receives inputted 5W1H information associated with the search of music transmitted from the information device, and the updating unit updates the corresponding stored 5W1H information within the music storage unit based on the transmitted 5W1H information, wherein the program stored on the hardware storage device is further executable by the server device to perform at least the following:

referring to the music storage unit at the server device and dividing a number of search characters included in the corresponding stored 5W1H information of the at least one song by a total number of keywords related to the inputted 5W1H information associated with the search of music;

scoring the at least one song by multiplying a result of the division by a corresponding play count; and matching the at least one song based on the scoring.

* * * * *